United States Patent [19]

Koyanagi et al.

[11] 4,090,015
[45] May 16, 1978

[54] METHOD FOR POLYMERIZING DIENIC MONOMERS

[75] Inventors: Shunichi Koyanagi; Niichiro Hasegawa; Toshihide Shimizu; Ichiro Kaneko; Sensaku Katsushima, all of Joetsu, Japan

[73] Assignee: Shin-Etsu Chemical Co., Ltd., Japan

[21] Appl. No.: 818,756

[22] Filed: Jul. 25, 1977

[30] Foreign Application Priority Data

Jul. 30, 1976  Japan .................................. 51-91068

[51] Int. Cl.² ........................... C08F 2/24; C08F 2/00; C08F 12/08; C08F 279/04
[52] U.S. Cl. .................. 526/62; 260/880 R; 526/74; 526/340
[58] Field of Search ................................ 526/62, 74

[56] References Cited

U.S. PATENT DOCUMENTS

| 3,201,378 | 8/1965 | Ketterer | 526/62 |
| 3,669,946 | 6/1972 | Koyanagi et al. | 526/62 |
| 4,007,320 | 2/1977 | Petersen | 526/62 |

Primary Examiner—Alan Holler
Attorney, Agent, or Firm—McGlew and Tuttle

[57] ABSTRACT

In the emulsion polymerization of a dienic monomer or a mixture containing a dienic monomer and at least one other copolymerizable monomer in an aqueous medium, the deposition of polymer scale on the inner walls of the polymerization reactor and other surfaces in contact with the monomer or monomeric mixture can be remarkably reduced or prevented by providing coating layers of an organopolysiloxane on those surfaces, prior to the polymerization, by applying the organopolysiloxane directly to the surfaces or by applying one or a mixture of hydrolyzable organosilanes to the surfaces, followed by hydrolysis-condensation of the silanes, to form the organopolysiloxane in situ.

11 Claims, No Drawings

METHOD FOR POLYMERIZING DIENIC MONOMERS

BACKGROUND OF THE INVENTION

The present invention relates to an improvement in the emulsion polymerization of a dienic monomer or a monomeric mixture containing a dienic monomer in an aqueous medium for the purpose of reducing or preventing the deposition of polymer scale on the inner walls of a polymerization reactor and other surfaces in contact with the monomer or monomeric mixture.

Emulsion polymerization is the most widely practiced technique for the preparation of a variety of synthetic rubber latices including styrene-butadiene rubber, acrylonitrile-butadiene rubber and chloroprene rubber as well as certain synthetic resins including acrylonitrile-butadiene-styrene and methylmethacrylatebutadiene-styrene, in which a dienic monomer is involved. However, in the prior art emulsion polymerization in an aqueous medium, one important problem is that large amounts of polymer scale will deposit on the inner walls of the polymerization reactor and other surfaces in contact with the monomer or monomers during the course of the polymerization. As a result, the cooling efficiency of the reactor decreases. Further, any scale that comes off the surface during the polymerization and eventually becomes mixed in the polymer product deteriorates the quality of the polymer. Furthermore, the removal of scale from the surfaces not only requires extensive labor and time but also gives rise to a serious health problem of workers as well as working environmental problems due to the presence of toxic, unreacted monomers absorbed in the scale.

The problem of the polymer scale deposition in the emulsion polymerization is especially formidable when the wall of the reactor and the stirrer are made of a metal, such as stainless steel, the very surfaces of which are exposed direct to the monomer or monomers. This is because polymer scale deposition on such surfaces is extremely large in amounts in the emulsion polymerization involving a dienic monomer, and may render it impossible to carry out the polymerization.

Methods for the prevention of polymer scale deposition have been proposed with respect to the polymerization of vinyl monomers, such as vinyl chloride, in an aqueous medium. According to the proposed method, the reactor walls and other surfaces are coated with certain polar organic compounds, amines, quinones and aldehydes as well as dyes, and the like (see, for example, U.S. Pat. No. 3,669,946). The method using those compounds for coating the surfaces is considerably effective in the polymerization of vinyl monomers, but it cannot be effectively applied to the emulsion polymerization of a dienic monomer or a mixture containing substantial amounts of a dienic monomer. Further, many of the compounds are colored compounds which tend to cause undesirable discoloration or staining to the polymer product. Furthermore, some of them are toxic and bring about a health problem to those handling the products.

SUMMARY OF THE INVENTION

It is therefore the object of the present invention to provide an effective means for preventing polymer scale formation in the usual emulsion polymerization for the preparation of a polymer with dienic monomer units in an aqueous medium in the presence of an emulsifier and a polymerization initiator.

The above object can be met by providing a coating layer of an organopolysiloxane on the inner walls of the polymerization reactor and other surfaces coming into contact with the polymerization mixture in usual emulsion polymerization applied to at least one dienic monomer or a monomeric mixture containing a substantial amount of at least one dienic monomer, or in the so-called graft copolymerization of at least one non-dienic monomer onto a preformed dienic polymer.

The present invention is based on the discovery as a result of extensive investigations that remarkable effects for preventing polymer scale formation by providing a layer of an organopolysiloxane compound on the inner walls of a polymerization reactor and other surfaces coming into contact with the monomer or monomers. This method is so efficient that polymer scale deposition can be almost completely eliminated, regardless of the material forming the surfaces, namely, stainless steel or glass-lined. The method of this invention is also advantageous in that the organopolysiloxane compounds are generally colorless and do not cause the undesired discoloring or staining problems and further in that their non-toxicity brings about no health problems of workers.

DETAILED DESCRIPTION OF THE PREFERRED EMBODIMENTS

The method of the present invention is characterized, as described hereinabove, by the provision of a layer of an organopolysiloxane compound on the inner walls of the polymerization reactor and other surfaces in contact with a dienic monomer or a monomeric mixture with at least one other copolymerizable monomer in emulsion polymerization.

In accordance with the method of the present invention, the layer of an organopolysiloxane compound on the inner walls of a polymerization reactor, a stirrer provided in the reactor and other surfaces all coming into contact with the monomer or monomers is formed by applying to those surfaces a solution or dispersion of the organopolysiloxane compound in a solvent or in a suitable dispersing medium by a conventional means, such as brush coating and spray coating, and subjecting the coated surfaces to drying, if necessary. The organopolysiloxane layer can, alternatively, be formed by applying to similar surfaces one or a mixture of two or more hydrolyzable functional organosilanes as such or in a similar solution or dispersion and then subjecting the organosilanes to hydrolysis-condensation in the presence of water, to produce an organopolysiloxane in situ.

The organopolysiloxane compounds useful for the formation of the coating layer in accordance with the present invention are not particularly limitative of their molecular structure, organic groups bonded to the silicon atoms therein, groups or atoms other than the organic groups bonded to the silicon atoms, and polymerization degree, insofar as they have a filmforming property. The organopolysiloxanes suitable for the method of the invention include silicone materials of any type, such as silicone fluids, silicone rubbers and silicone varnishes, i.e. silicone resins.

Illustrative of the silicone fluids are dimethylpolysiloxanes, methylphenylpolysiloxanes, methylethylpolysiloxanes, methylhydrogenpolysiloxanes, methylphenylhydrogenpolysiloxanes, trifluoropropylmethylpolysiloxanes, and any thereof with small amounts of functional groups, such as hydroxy and alkoxy groups bonded to the silicon atoms, containing chain terminating groups, such as trimethylsilyl, phenyldimethylsilyl, vinyldimethylsilyl, ethyldimethylsilyl and hydrogendimethylsilyl groups.

Among the above-mentioned silicone fluids, most preferred are methylhydrogenpolysiloxanes mixed, if necessary, by a metal salt (e.g. lead octoate) as a catalyst for crosslink formation.

Illustrative of the silicone rubbers are diorganopolysiloxanes terminated at both chain ends with hydroxy groups, mixtures thereof with an alkoxysilane or its partial hydrolysis-condensate, mixtures of a diorganopolysiloxane having at least two alkenyl groups, such as vinyl groups, bonded directly to the silicon atoms in a molecule at any positions of the molecular chains with an organohydrogenpolysiloxane. All these silicone rubbers are curable by the formation of crosslinks at room temperature or at an elevated temperature in the presence of a catalyst, such as organic peroxides, metal salts of organic acids, and platinum compounds or in the presence of water.

It is preferred to form a layer of an elastomeric organopolysiloxane by applying a solution of a room-temperature-vulcanizing (RTV) silicone composition, followed by drying and curing, if necessary, at an elevated temperature. The mechanism of the crosslink formation is well known in the silicone technology, and not limitative.

Illustrative further of the silicone varnishes or silicone resins are organopolysiloxanes having a molecular structure that is curable into a three dimensional network structure. They are expressed by the average unit formula $$R_a SiO_{\frac{4-a}{2}}$$

where R is an organic group and $a$ is a positive number in the range from 1.0 to 1.8. The organic group R is exemplified by alkyl groups, such as methyl, ethyl, propyl and butyl groups; aryl groups, such as phenyl group; alkenyl groups, such as vinyl and allyl groups; and substituted groups thereof with halogen atoms or cyano groups in place of the hydrogen atoms bonded to the carbon atoms in the organic groups. These silicone varnishes can be those modified with epoxy resins, alkyd resins, melamine resins, polyester resins or the like.

The silicone varnishes suitable for use in the present invention are preferably those which are curable at room temperature or at a slightly elevated temperature in order to facilitate the formation of an organopolysiloxane layer on the surfaces.

In accordance with the method of the present invention, the above silicone fluids, silicone rubbers and silicone varnishes are preferred to contain methyl groups at least 50 mole % of all organic groups bonded to the silicon atoms.

It is added that when the value of $a$ in the above-mentioned average unit formula representing the silicone varnishes is 1.0, the organopolysiloxane expressed by the formula is composed of trifunctional organosiloxane units alone, and it can be an alkali metal siliconate represented by the general formula $RSi(OM)_3$ where M is an atom of an alkali metal, and used in the form of an aqueous solution for coating purposes.

It is convenient to apply the coating-forming organopolysiloxane to the inner walls of the polymerization reactor and other surfaces in the form of a solution or dispersion in a suitable solvent or dispersing medium. Such solvents or dispersion mediums are water, aliphatic or aromatic hydrocarbon solvents, chlorinated hydrocarbon solvents, alcohol solvents, ester solvents, ketone solvents the like. When the organopolysiloxane is used in the form of a dispersion in water, it is preferred that a suitable dispersing agent, such as an emulsifier, is added.

It is in most cases recommended that the coating layers thus formed are heated in order to accelerate drying and curing of the organopolysiloxane at a temperature ranging from room temperature to 200° C. The amount of the coating organopolysiloxane applied to the surfaces, enough to prevent polymer scale deposition is at least 0.001 g/m² as dried.

It is some times advisable to add small amounts of the organopolysiloxane compounds to the polymerization mixture, along with the coating of the surfaces, in order to obtain further better results of polymer scale prevention. In this case, incidentally, the organopolysiloxane compounds added are readily dispersed in the aqueous polymerization medium owing to the presence of an emulsifying agent which has previously been included for purposes of the emulsion polymerization of a dienic monomer or monomeric mixture.

Next, the alternative method for the formation of the organopolysiloxane layers on the various surfaces in accordance with the present invention is, as referred to hereinbefore, carried out by applying one or a mixture of two or more hydrolyzable polyfunctional, say, difunctional or trifunctional, organosilanes in the form of an organic solution or an aqueous dispersion and subjecting the resulting silane coatings to hydrolysis-condensation in the presence of water at room temperature or, if necessary, under heating, to form layers of the cured organopolysiloxane in situ.

Illustrative of the difunctional organosilanes used in the above method are dimethyldichlorosilane, methylphenyldichlorosilane, methylethyldichlorosilane, diphenyldichlorosilane, methylvinyldichlorosilane, dimethyldimethoxysilane, dimethyldiethoxysilane, methylphenyldiethoxysilane, diphenyldiethoxysilane and methylvinyldiethoxysilane.

Illustrative of the trifunctional organosilanes are methyltrichlorosilane, phenyltrichlorosilane, ethyltrichlorosilane, methyltrimethoxysilane, methyltriethoxysilane, phenyltrimethoxysilane, phenyltriethoxysilane, ethyltriethoxysilane, vinyltrimethoxysilane and vinyltriethoxysilane.

These difunctional and trifunctional organosilanes may be used in the form of mixtures with small amounts of monofunctional silanes, such as trimethylchlorosilane and triphenylethoxysilane, or tetrafunctional silanes, such as silicon tetrachloride and ethyl orthosilicate.

For purposes of the method of the present invention, the preferred hydrolyzable polyfunctional organosilanes contain methyl groups at least 50 mole % to all hydrocarbon groups bonded directly to the silicon atoms.

The hydrolyzable organosilanes which are halogenosilanes are used for coating the surfaces in the form as such or of a solution in the same organic solvent as mentioned hereinbefore with reference to the solutions of the coating organopolysiloxane compounds, to subsequently form organopolysiloxane coating layers in situ by hydrolysis-condensation reaction in the presence of water. The hydrolysis-condensation reaction can proceed even at room temperature, optionally with heating at an elevated temperature in order to accelerate the reaction.

The organosilanes which are alkoxysilanes are applied to the surfaces in the form as such or of a solution or dispersion in a medium, such as water or a similar organic solvent, followed by hydrolysis-condensation in a similar manner, to form an organopolysiloxane layer in situ. It is optional to use a small amount of a catalyst, such as acids, alkalis and metal salts of organic acids, thereby to accelerate the hydrolysis-condensation reaction.

Now that the inner walls of the polymerization reactor and other surfaces coming into contact with a dienic monomer or monomeric mixture are provided with the organopolysiloxane coating layer, water, an emulsifier, a polymerization initiator and the other necessary substances for emulsion polymerization, as well as the dienic monomer or monomeric mixture, are charged into the polymerization reactor, and a usual emulsion polymerization process is carried out. Proportions among the substances thus charged, kinds of the emulsifier and the polymerization initiator, polymerization temperature, velocity of agitation and other operational conditions are not limitative, but may be the same as in the conventional emulsion polymerization.

Examples of the dienic monomers suitable for use in the method of the present invention are 1,3-butadiene, isoprene, chloroprene, 2,3-dimethyl-1,3-butadiene, 1,3-pentadiene, 1,3-hexadiene, 1,3-heptadiene, 2,3-dichloro-1,3-butadiene, 1,3-cyclohexadiene, cyclopentadiene and the like. Non-dienic monomers copolymerizable with the dienic monomers include styrene, acrylonitrile, methacrylonitrile, acrylic acid, methacrylic acid, ethyl acrylate, butyl acrylate, 2-ethylhexyl acrylate, methyl methacrylate, ethyl methacrylate, n-butyl methacrylate, glycidyl methacrylate, α-chloroacrylonitrile, vinyl isobutyl ether, vinyl acetate, vinyl chloride, vinylidene chloride, methylvinylketone, 2-vinylpyridine, 9-vinylcarbazol, α-methylstyrene, ethylene and propylene.

The emulsion polymerization in accordance with the present invention involves, besides the homo- or copolymerization of the above-mentioned dienic monomer or monomers, the polymerization of a mixture of the above-mentioned dienic monomer or monomers and the non-dienic monomer or monomers and the graft copolymerization of the non-dienic monomer or monomers onto a preformed dienic polymer, the amount of the diene component present in each copolymerizing mixture being such that the resulting polymer contains dienic monomer units in a weight fraction of at least 5%, or, particularly, at least 10%, the remaining being non-dienic units.

The emulsifiers useful in the emulsion polymerization of the present invention are not limitative, and are exemplified by anionic surface active agents, such as sodium laurylsulfate, sodium stearate, sodium dodecylbenzene sulfonate, sodium octylsulfosuccinate, sodium salts of paraffinsulfonic acids, sodium salts of alkylnaphthalenesulfonic acids and sodium rosinate; and nonionic surface active agents, such as sorbitan monolaurate, polyoxyethylene alkyl ethers, polyoxyethylene nonylphenyl ethers, polyethyleneglycol monolaurate and polyoxyethylene sorbitan monostearates.

The polymerization initiators useful in the emulsion polymerization are exemplified by water-soluble initiators, such as potassium persulfate, ammonium persulfate, hydrogen peroxide, cumene hydroperoxide and paramenthane hydroperoxide; monomer-soluble initiators, such as lauroyl peroxide, diisopropylperoxy dicarbonate, 2-ethylhexylperoxy dicarbonate, t-butylperoxy pivalate and α,α'-azobisisobutyronitrile; and various redox system polymerization initiators.

Other substances to be added to the polymerization mixture according to need include chain transfer agents, pH-controlling agents, oxidation inhibitors, antistatic agents, and the like.

The following examples will further illustrate the method of the present invention by way of typical embodiments, but not to limit the scope of the inventive method. In the examples, parts and percentages are all by weight.

EXAMPLE 1

In this example, polymerization reactors of stainless steel, each equipped with a stirrer were used.

The inner walls of each polymerization reactor and the surfaces of the stirrer were coated with a 3% solution of one of coating materials (a) to (i) as specified below in an amount of 0.01 to 0.05 g/m$^2$ as non-volatile matter, followed by drying at room temperature for 30 minutes, to form an organopolysiloxane layer. The solvent used in forming the solution was toluene except in coating material (e).

Coating material (a): Demethylsilicone fluid (KF 96) having a viscosity of 100 centistokes at 25° C.
Coating material (b): Methylphenylsilicone fluid (KF 54) having a viscosity of 400 centistokes at 25° C.
Coating material: (c): Room temperature-vulcanizing silicone rubber (KE 47RTV), curable by dealcoholation-condensation to form crosslinks.
Coating material (d): Methylsilicone varnish (KR 252).
Coating material (e): Methylhydrogensilicone fluid with curing catalyst in petroleum naphtha (Polon T).
Coating material (f): Methylphenylsilicone varnish (KR 282).
Coating material (g): Alkyd-modified silicone varnish (KR 206).
Coating material (h): Methylhydrogenpolysiloxane fluid (KF 99).
Coating material (i): Methylmethoxypolysiloxane fluid (KC 89).

The above-mentioned coating materials are all products of Shin-Etsu Chemical Co., Ltd., Japan, with trade names in brackets.

Into each of the thus coated polymerization reactor were introduced 180 parts of water, 4.5 parts of sodium dodecylbenzenesulfonate, 0.28 parts of t-dodecylmercaptan, 0.3 parts of potassium persulfate, 75 parts of 1,3-butadiene and 25 parts of styrene, and a single run of emulsion polymerization was carried out with agitation at 50° C for 12 hours.

For comparative purposes, a similar test was conducted with an uncoated polymerization reactor of the same type.

The results of the above tests Nos. 1–10 are set out in Table I to show the amount of polymer scale deposited on the surfaces during the polymerization run.

Table

| Test No. | Coating material | Polymer scale g/m² |
| --- | --- | --- |
| 1 | None | 320 |
| 2 | (a) | 12 |
| 3 | (b) | 20 |
| 4 | (c) | 2 |
| 5 | (d) | 0 |
| 6 | (e) | 0 |
| 7 | (f) | 2 |
| 8 | (g) | 5 |
| 9 | (h) | 0 |
| 10 | (i) | 0 |

EXAMPLE 2

The inner walls of each polymerization reactor of stainless steel and the surfaces of the stirrer installed within the reactor were coated with a 5% solution of one of Coating materials (d) and (f) above and (j) to (m) as specified below and prepared by dilution with methylene chloride, and the resulting coatings were subjected to drying at room temperature for 30 minutes in tests 12–14, 16 and 17 and at 200° C for 1 hour in Test No. 15. In Test No. 11 which was directed to control, no coating was carried out.

Coating material (j): KF 99 (see above) mixed by 0.5% of lead octoate.
Coating material (k): KC 89 (see above) mixed by 0.3% (based on the siloxane) of iron (III) chloride.
Coating material (l): Mixture of 50 g dimethylpolysiloxane terminated with hydroxy groups at both chain ends having a viscosity of 20 centistokes at 25° C, 10 g ethyl orthosilicate and 0.5 dibutyltin dilaurate.
Coating material (m): Mixture of 50 g a methylvinylpolysiloxane having a viscosity of 10 centistokes at 25° C and 50 g KF 99 (see above) mixed by an isopropyl alcohol solution of chloroplatinic acid in an amount of 10 mg as platinum.

Into the reactor thus coated were introduced 200 parts of water, 4.5 parts of sodium laurylbenzenesulfonate, 0.18 parts of dodecylmercaptan, 0.05 parts of tetrasodium ethylene-diaminetetraacetate, 0.08 parts of sodium formaldehyde sulfoxylate, 0.5 parts of paramenthane hydroperoxide, 71 parts of iron (II) sulfate, 0.5 parts of sodium orthophosphate, 71 parts of 1,3-butadiene and 29 parts of styrene. Then polymerization was carried out with each reactor with agitation at 5° C for 10 hours. After completion of each polymerization run, the polymerization mixture was discharged out of the reactor, a dash of water was applied on the surfaces, and then subsequent polymerization runs were undertaken with the same formulation and under the same operational conditions. Such polymerization runs were repeated to record the number of runs in which polymer scale deposition or buildups on the surfaces did not exceed 1 g/m². The number of runs thus recorded are shown in Table II under the heading "No. of non-scale runs".

Table II

| Test No. | Coating material | No. of non-scale runs |
| --- | --- | --- |
| 11 | None | 0 |
| 12 | (j) | 13 |
| 13 | (k) | 16 |
| 14 | (d) | 5 |
| 15 | (f) | 22 |
| 16 | (l) | 19 |
| 17 | (m) | 21 |

EXAMPLE 3

A glass-lined polymerization reactor equipped with a stirrer was employed in this example. The inner walls of each polymerization reactor and the surfaces of the stirrer were coated with a 3% carbon tetrachloride solution of coating material (n) to (p) as specified below and the same (h) used in Example 1, followed by drying at room temperature for 1 hour, to form an organopolysiloxane layer, in Tests Nos. 19 through 22 except in Test No. 18 which was directed to control.

Coating material (n): Mixture of dimethyldichlorosilane and methyltrichlorosilane in equal amounts.
Coating material (o): Trifluoropropylmethylpolysiloxane fluid having a viscosity of 5 centistokes at 25° C.
Coating material (p): Dimethylpolysiloxane terminated at both chain ends with hydroxy groups, having a viscosity of 20 centistokes at 25° C.

Into the thus coated polymerization reactor were introduced 180 parts of water, 4 parts of sodium oleate, 1 part of oleic acid, 0.5 parts of t-dodecylmercaptan, 0.1 part of sodium pyrophosphate, 0.3 parts of potassium persulfate, 74 parts of 1,3-butadiene and 26 parts of acrylonitrile, and a single run of emulsion polymerization was carried out at 40° C for 12 hours.

The results of Tests Nos. 18–22 are set out in Table III to show the amount of polymer scale deposition occurring in the polymerization run.

Table III

| Test No. | Coating material | Polymer scale g/m² |
| --- | --- | --- |
| 18 | None | 45 |
| 19 | (n) | 0 |
| 20 | (o) | 0 |
| 21 | (p) | 0 |
| 22 | (h) | 0 |

EXAMPLE 4

The inner walls of each polymerization reactor of stainless steel and the surfaces of the stirrer were coated with one of coating materials (q) to (t) as specified below or the same (j) as used in Example 2 in the same manner as in Example 2 excepting that drying was conducted at 90° C for 30 minutes in all Tests Nos. 24–28, to form an organopolysiloxane layer. Test No. 23 was a control in which no coating was undertaken.

Coating material (q): Silicone resin composed of 52 mole % dimethylsiloxane units and 48 mole % methylsiloxane units mixed with 0.1% iron octoate.
Coating material (r): Methylsilicone varnish KR 220 (product of Shin-Etsu Chemical Co.) mixed with 0.1% (based on the siloxane) iron octoate.
Coating material (s): Methylphenylsilicone varnish KR 272 (product of Shin-Etsu Chemical Co.).
Coating material (t): KC 89 (see above) mixed with 0.5% (based on the siloxane) iron (III) chloride.

Into ech polymerization reactor thus coated were introduced 30 parts of a polybutadiene latex with a solid content of 50%, 50 parts of styrene, 20 parts of acrylonitrile, 0.1 part of t-hexadecylmercaptan, 0.5 parts of potassium oleate and 0.5 parts of potassium persulfate, and a single run of emulsion polymerization was carried out at 50° C for 15 hours, to produce an ABS resin.

The amount of polymer scale deposited on the surfaces in each test is set out in Table IV.

Table IV

| Test No. | Coating material | Polymer scale g/m$^2$ |
|---|---|---|
| 23 | None | 180 |
| 24 | (j) | 0 |
| 25 | (q) | 0 |
| 26 | (r) | 0 |
| 27 | (s) | 0 |
| 28 | (t) | 0 |

EXAMPLE 5

The inner walls of each stainless steel polymerization reactor and the surfaces of the stirrer equipped therein were coated with one of coating materials (u) to (y) as specified below or the same (s) as used in Example 4, to form an organopolysiloxane layer. In the coating were used 5% benzene solutions of the organopolysiloxane in Tests Nos. 30–33 and aqueous dispersions or solutions of the silicone of 5% concentration in Tests Nos. 34–36. Drying or curing conditions were varied as shown in Table V. In Test No. 29 which was a control, no coating was undertaken.

Coating material (u): Methylsilicone varnish KR 251 (product of Shin-Etsu Chemical Co.).
Coating material (v): KR 251 (see above) mixed by 0.5% (based on the siloxane) of iron octoate.
Coating material (w): Aqueous emulsion of methylhydrogenpolysiloxane, Polon MR (product of Shin-Etsu Chemical Co.).
Coating material (x): Polon MR (see above) mixed by 0.5% (based on the siloxane) of zinc octoate.
Coating material (y): Aqueous solution of sodium methylsiliconate, Polon C (product of Shin-Etsu Chemical Co.).

Into each polymerization reactor thus coated were introduced 180 parts of water, 4.5 parts of sodium laurylbenzene sulfonate, 0.28 parts of t-dodecylmercaptan, 0.3 parts of potassium persulfate, 40 parts of 1,3-butadiene, 54 parts of methyl methacrylate and 4 parts of styrene.

Then, emulsion polymerization was carried out with each reactor with agitation at 50° C for 10 hours in the same manner as in Example 2 to determine the "No. of non-scale runs". The results are set out in Table V.

Table V

| Test No. | Coating material | Drying/curing | No. of non-scale runs |
|---|---|---|---|
| 29 | None | — | 0 |
| 30 | (u) | R.T., 30 minutes | 5 |
| 31 | (v) | 150° C, 1 hour | 18 |
| 32 | (s) | R.T., 30 minutes | 4 |
| 33 | (s) | 200° C, 1 hour | 32 |
| 34 | (w) | R.T., 30 minutes | 3 |
| 35 | (x) | R.T., 30 minutes | 11 |
| 36 | (y) | 90° C, 30 minutes | 5 |

Note: R.T. is room temperature.

EXAMPLE 6

The inner walls of each stainless steel polymerization reactor and the surfaces of the stirrer installed therein were coated with a 10% solution of one of coating materials (z), (aa) and (bb) as specified below and the same (c), (h), (i) and (u) as previously used, and prepared by dilution with xylene. The resulting coatings were subjected to drying at 90° C for 30 minutes by way of Tests Nos. 38–44, to produce an organopolysiloxane layer. Test No. 37 was a control, in which no coating was undertaken.

Coating material (z): Methylsilicone varnish KR 253 (product of Shin-Etsu Chemical Co.).
Coating material (aa): Room temperature-vulcanizing silicone rubber KE 41RTV (product of Shin-Etsu Chemical Co.), which is curable by condensation reaction between an acetoxy-containing silane and a hydroxy-terminated dimethylpolysiloxane.
Coating material (bb): Alkyd-modified silicone varnish KR 201 (product of Shin-Etsu Chemical Co.).

Into each polymerization reactor thus coated were introduced 6,320 parts of water, 38 parts of sodium hydroxide, 24 parts of a sodium salt of a formaldehydenaphthalene sulfonic acid condensate, 24 parts of potassium persulfate, 160 parts of rosin, 14 parts of n-dodecylmercaptan and 4,000 parts of chloroprene. Then emulsion polymerization was carried out with agitation at 40° to 45° C till the monomer conversion reached about 70%. Thereupon, 1,680 parts of water, 8 parts of the sodium salt of formaldehyde-naphthalene sulfonic acid condensate, 17 parts of sodium laurylbenzene sulfonate, 1,120 parts of benzene, 8 parts of phenothiazine and 140 parts of phenyl-β-naphthylamine were added to the polymerization mixture to continue the polymerization reaction at the same temperature.

As a result of each test above, the amount of polymer scale deposition on the surfaces was as set out in Table VI.

Table VI

| Test No. | Coating material | Polymer scale g/m$^2$ |
|---|---|---|
| 37 | None | 1,200 |
| 38 | (z) | 18 |
| 39 | (u) | 10 |
| 40 | (h) | 2 |
| 41 | (c) | 0 |
| 42 | (i) | 5 |
| 43 | (aa) | 0 |
| 44 | (bb) | 0 |

What is claimed is:

1. In a method for preparing a polymer with dienic monomer units in a weight fraction of at least 5% by emulsion polymerization in an aqueous medium in the presence of an emulsifier and a polymerization initiator in a polymerization reactor, the improvement comprising forming a coating layer of an organopolysiloxane on the surfaces of the inner walls of the polymerization reactor and other instruments in contact with the polymerization mixture.

2. The method as claimed in claim 1 wherein the formation of said coating layer is carried out by applying a solution or dispersion of the organopolysiloxane to said surfaces.

3. The method as claimed in claim 1 wherein the formation of said coating layer is carried out by applying a solution or dispersion of at least one hydrolyzable organosilane to said surfaces and hydrolysiscondensating said organosilane in situ.

4. The method as claimed in claim 1 wherein said organopolysiloxane is curable by crosslinking.

5. The method as claimed in claim 1 wherein said organopolysiloxane contains methyl groups in an amount of at least 50 mole % of all organic groups bonded to the silicon atoms.

6. The method as claimed in claim 1 wherein said organopolysiloxane is an alkali silanolate.

7. The method as claimed in claim 1 wherein the amount of said coating layer formed on said surfaces is at least 0.001 g/m² as dried.

8. The method as claimed in claim 1 wherein said same or different organopolysiloxane is additionally added to the polymerization mixture.

9. The method as claimed in claim 1 wherein said organopolysiloxane is a methylhydrogenpolysiloxane fluid admixed a curing catalyst.

10. The method as claimed in claim 1 wherein said organopolysiloxane is a room-temperature-vulcanizing silicone elastomer.

11. The method as claimed in claim 1 wherein said organopolysiloxane is an organopolysiloxane resin curable at room temperature.

* * * * *